United States Patent
Rostami

(10) Patent No.: US 6,689,832 B1
(45) Date of Patent: Feb. 10, 2004

(54) METHACRYLATE MOULDING COMPOSITION FOR OBTAINING DECORATIVE COLORED SHEET MATERIAL

(75) Inventor: Shamsedean Rostami, Cleveland (GB)

(73) Assignee: Lucite International UK Limited, Southampton (GB)

(*) Notice: Subject to any disclaimer, the term of this patent is extended or adjusted under 35 U.S.C. 154(b) by 0 days.

(21) Appl. No.: 09/831,877

(22) PCT Filed: Nov. 16, 1999

(86) PCT No.: PCT/GB99/03817

§ 371 (c)(1), (2), (4) Date: Nov. 20, 2001

(87) PCT Pub. No.: WO00/29480

PCT Pub. Date: May 25, 2000

(30) Foreign Application Priority Data

Nov. 17, 1998 (GB) ............................................... 9825066

(51) Int. Cl.⁷ .......................... C08K 3/00; C08K 3/10; C08K 3/12; C08K 3/22
(52) U.S. Cl. ...................... 524/423; 524/436; 524/437; 524/451
(58) Field of Search ................................. 524/436, 437, 524/423, 451

(56) References Cited

U.S. PATENT DOCUMENTS

| | | | | | |
|---|---|---|---|---|---|
| 3,370,026 A | * | 2/1968 | Patella et al. | ................ | 527/314 |
| 3,405,088 A | * | 10/1968 | Slocum | ........................ | 524/423 |
| 3,663,493 A | * | 5/1972 | Miller | ........................ | 523/220 |
| 3,801,693 A | * | 4/1974 | Stallings et al. | ............ | 264/246 |
| 3,814,790 A | * | 6/1974 | Kato et al. | ................... | 264/122 |
| 3,847,865 A | * | 11/1974 | Duggins | ..................... | 524/437 |
| 5,753,362 A | * | 5/1998 | Kawase et al. | ............. | 428/327 |
| 5,756,211 A | * | 5/1998 | Ittmann et al. | ............. | 428/409 |
| 5,882,560 A | * | 3/1999 | Ittmann et al. | ............. | 264/122 |

FOREIGN PATENT DOCUMENTS

GB  2220002 A  * 12/1989

* cited by examiner

Primary Examiner—Judy M. Reddick
(74) Attorney, Agent, or Firm—Pillbury Winthrop LLP

(57) ABSTRACT

A process for forming an acrylic sheet material comprises preparing a mixture comprising: (I) 20–89% wt of an acrylic polymer which is a copolymer containing 50–99% wt of methyl methacrylate unites and 1–50 wt % of a copolymerizable alkyl acrylate; (ii) 10–80 wt % of a mineral filler composition selected from the group comprising alumina trihydrate, magnesium hydroxide, talc and barium sulphate; and (iii) 1–40 wt % of decorative particles; and melt-moulding the mixture at a temperature above 150° C. to form a solid article. The process enables thermoformable acrylic articles which have the natural appearance of granite to be produced.

30 Claims, No Drawings

METHACRYLATE MOULDING COMPOSITION FOR OBTAINING DECORATIVE COLORED SHEET MATERIAL

The present invention relates to moulded plastics materials containing filler particles.

Polymeric materials may be formed in several different ways. Acrylic sheet materials are particularly useful for forming into articles such as architectural cladding, bathtubs, shower enclosures, panelling etc. Filled curable moulding compositions based on acrylic polymers which comprise a polymerisable syrup of polymer in monomer, usually containing a high proportion of filler particles are widely used for moulding into kitchen sinks etc. The cured articles have superior properties imparted by the fillers in the moulding composition and the high molecular weight and crosslinking of the polymer. Although the casting process produces a very good product it is relatively expensive because each article must be made separately on a batch basis. Thick sheets of cured acrylic composite material may also be made by a continuous casting process. An example of such a sheet is "Corian"™ sold by DuPont. These materials are useful for making articles such as work surfaces, however they are rigid and not easily shapeable and usually must be cut and glued together to form 3-dimensional shapes. Also the continuous casting process requires very specialised processing equipment since the curing of cast syrup must be done under controlled conditions to produce optimum product quality. There is therefore a need for a polymeric material which has some of the benefits of filled acrylic composite materials but which may be shaped by thermoforming techniques. There is also a need for a method of making polymeric composite articles using cheaper processing methods.

According to the invention a process for forming an acrylic material comprises preparing a mixture comprising:

(i) 20–89 wt % of an acrylic polymer which is a copolymer containing 50–99% wt of methyl methacrylate units and 1–50 wt % of a copolymerisable alkyl acrylate;

(ii) 10–80 wt % of a mineral filler composition selected from the group comprising alumina trihydrate, magnesium hydroxide, talc and barium sulphate;

(iii) 1–40 wt % of decorative particles;

and melt-moulding the mixture at a temperature above 150° C. to form a solid article.

According to a second aspect of the invention we provide a melt-mouldable composition comprising:

(i) 20–89 wt % of an acrylic polymer which is a copolymer containing 50–99% wt of methyl methacrylate units and 1–50 wt % of a copolymerisable alkyl acrylate or other methacrylate;

(ii) 10–80 wt % of a mineral filler composition selected from the group comprising alumina trihydrate, magnesium hydroxide, talc and barium sulphate; and (iii) 1–40 wt % of decorative particles.

The acrylic material may be further shaped by thermoforming techniques into useful articles such as contoured worktops or vanity unit surfaces, especially when the material is in the form of a sheet. Also multi-layer structures may be made by laminating the acrylic composite sheet to a substrate material or by coextruding the acrylic composite onto a thermoplastic substrate or by extrusion coating onto e.g. a board substrate.

The production of filled acrylic articles by melt processing is more economical than casting and curing polymerisable compositions so the benefits of a filled acrylic material may be achieved at relatively low cost. The articles produced in this way have a solid look and feel and the natural look of stone may be achieved by selecting appropriate colours and particles.

The acrylic copolymer is a copolymer of methyl methacrylate. 50–99% by weight of the monomer units from which it is formed are derived from methyl methacrylate monomer. The remaining units comprise one or more copolymerisable alkyl acrylate or other methacrylate units, which may include functionalised alkyl acrylates. Preferred acrylates include $C_1$–$C_8$ alkyl acrylate, especially methyl, ethyl and butyl acrylate. Particularly preferred copolymers are derived from 70–95% methyl methacrylate and 5–30% of $C_1$–$C_4$ alkyl acrylate units. The resulting copolymer preferably has a Tg of at least 60° C.

The acrylic copolymer may be made by any known polymerisation methods, especially solution, dispersion or bulk polymerisation. The polymer may contain residues of a polymerisation initiator, or other process additive. Preferred polymers also contain residues derived from polymerisation controllers such as chain transfer agents which are added to control molecular weight. Especially preferred additives include those chain transfer agents which also enhance the thermal stability of the polymer such as mercaptans, e.g. alkyl mercaptans. Suitable mercaptans and polymerisation methods using mercaptans as chain transfer agents in the production of acrylic polymers are already well known in the art.

The acrylic copolymer is mouldable in its molten form, i.e. it is of a grade of acrylic polymer which is generally classed as suitable for moulding. The melt flow index (MFI) of the polymer is preferably in the range 0.5–25 g/10 mins at 230° C./3.8 kg (ASTM D-1238), more preferably 0.8–16 g/10 mins. Typically the molecular weight is between 60,000 and 180,000 preferably in the range 80,000 to 150,000 Mw, e.g. 90,000–120,000.

The mouldable composition comprises 20–89, preferably 40–80% wt of copolymer.

The mineral filler is a particulate mineral compound selected from alumina trihydrate (Al $(OH)_3$) (ATH), magnesium hydroxide ($Mg(OH)_2$), talc or barium sulphate. The particles preferably have an average particle size of 5–100 μm, e.g. about 10–20 μm. The mouldable composition and resulting article may contain 10–80 wt % of the filler, preferably 10–50 wt %. A mixture of more than one mineral compound may be used as the filler.

The melt-mouldable mixture and resulting moulded article also contain decorative particles, e.g. coloured particles which provide a decorative effect to the sheet. Suitable particles include polymeric particles such as coloured polyester or cross-linked acrylic particles of e.g. 5–5000 μm average size. The decorative particles may contain colourants, opacifiers, fillers, plasticisers, stabilisers, lubricants etc. The mixture may contains 1–40% of such coloured particles, preferably 10–30% wt, more preferably 5–20% wt. A mixture of different coloured particles may be used to provide different appearances, e.g. to simulate the appearance of natural materials such as stone or granite.

The mixture may also contain other additives, such as stabilisers, toughening agents, lubricants, pigments and dyes. Suitable toughening agents include rubbers e.g. MBS rubber, core-shell particle toughening agents, e.g. graft copolymer core shell particles made from butyl acrylate and MMA, SEBS, Kraton, or SBR etc. The toughening agent may be present in the polymer at levels of 1–50%, more typically 3–25% A pigment or dye may be present in the polymer prior to mixing the polymer with the filler and other ingredients.

By melt-moulding we mean forming a shaped article by moulding under conditions, especially temperature, in which the polymer is molten and can be caused to flow and then cooling below the melt temperature such that the mixture retains the shape formed when the polymer was molten. Preferred such methods include extrusion and injection moulding. Preferably the moulding temperature is less than 270° C. and is more preferably 150–220° C. The moulding temperature must be maintained below the decomposition temperature of any of its constituents. For example, when ATH is used as the filler then the temperature should be maintained below the decomposition temperature of ATH.

In one preferred form we provide a process for forming an acrylic article comprising the steps of feeding to an extruder a mixture comprising:

(i) 20–89 wt % of an acrylic polymer which is a copolymer containing 50–99% wt of methyl methacrylate units and 1–50 wt % of a copolymerisable alkyl acrylate;

(ii) 10–80 wt % of a mineral filler composition selected from the group comprising alumina trihydrate, magnesium hydroxide, talc and barium sulphate;

(iii) 1–40 wt % of decorative particles;

and extruding the mixture at a temperature above 150° C. through a die and subsequently cooling the extrudate to form a solid article.

In a second preferred form we provide a process for forming an acrylic article comprising the steps of forming a mixture comprising:

(i) 20–89 wt % of an acrylic polymer which is a copolymer containing 50–99% wt of methyl methacrylate units and 1–50 wt % of a copolymerisable alkyl acrylate;

(ii) 10–80 wt % of a mineral filler composition selected from the group comprising alumina trihydrate, magnesium hydroxide, talc and barium sulphate;

(iii) 1–40 wt % of decorative particles;

and injection-moulding the mixture at a temperature above 150 ° C into a mould to form a solid article.

A preferred form of article is a sheet, which may vary in thickness between <1 mm and about 20 mm, e.g. 1–10 mm. Many other shapes of articles are possible, especially when using injection moulding techniques to melt mould the article.

We also provide a thermoformable article, preferably in the form of a sheet, comprising (i) 20–89 wt % of an acrylic polymer which is a copolymer containing 50–99% wt of methyl methacrylate units and 1–50 wt % of a copolymerisable alkyl acrylate;

(ii) 10–80 wt % of a mineral filler composition selected from the group comprising alumina trihydrate, magnesium hydroxide, talc and barium sulphate;

(iii) 1–40 wt % of decorative particles.

The invention will now be further described in the following examples.

EXAMPLE 1

1600 g of a copolymer of methyl methacrylate (PMMA) with about 12 wt % ethyl acrylate having an average molecular weight (Mw) of around 90,000 (by GPC using PMMA standards) and MFI of 13 g/10 min as measured at 230° C./3.8 kg was mixed with 400 g (20 wt %) of fine mineral particles of alumina trihydrate (ATH) with mean particle size of 8 µm, and 300 g (13 wt % ) of a 1:1 mixture of black and white decorative coloured polyester particles having an average particle size of 0.1 to 0.6 mm (supplied by the J. Marshall company). The mixture was dry blended at first and then delivered to an extruder and passed through a die at 180° C. to shape it into a 3 mm thick flat sheet. It was cooled and slightly pressed between two rotating rollers which were operating at room temperature. The resulting extruded tape had the appearance of a granite material.

EXAMPLE 2

Example 1 was repeated with 1 wt % of lubricant PTFE particles added to the mixture at the dry blending operation stage. The new mixture was extruded into 3 mm sheet using an average extrusion temperature of 170° C.

EXAMPLE 3

5 w % of MBS toughening agent was added to the mixture in Example 1, dry blended and extruded at 180° C. A sheet with natural granite appearance was made. Its properties are given in Table 1.

EXAMPLE 4

The base polymer used in Example 1 was pigmented by the use of known mineral based pigments frequently used in conjunction with acrylics products. Samples having the appearance of various granites from white to pink, to grey, to red were made.

EXAMPLE 5

The ATH filler used in Example 1 was replaced with a more thermally stable magnesium hydroxide material (at 20 wt %) with an average particle size of about 2–5 microns. A 3 mm thick sheet with granite appearance was made.

EXAMPLE 6

Example 1 was repeated but coloured polyester decorative particles with much larger particle size in the range 1 to 1.4 mm were used.

EXAMPLE 7

Preparation of Thermoformed Article

The sheet made in Example 1 was thermoformed into a small cup using the following conditions:

Composite polymer sheet of 3 mm thickness was cut to 14 cm×16.5 cm to allow it to be secured onto the mould. The mould and polymer assembly were then placed in an electric oven preheated at 170° C. After 30 minutes a two stage rotary vacuum pump was attached to the mould and maximum vacuum applied. Once thermoforming had been completed the oven heating was turned off and vacuum continued to be applied until the PMMA surface temperature had dropped to 80° C. A cup with diameter of 60 mm and depth of 25 mm was successfully vacuum formed from this material.

EXAMPLE 8

Example 1 was repeated but instead of extruding the mixture it was injection moulded into test pieces, using a conventional injection moulding machine with the barrel temperature setting of around 190° C. The test pieces had the appearance of granite, although the decorative particles were not uniformly distributed. Some of their properties are listed in Table 1.

EXAMPLE 9

Example 8 was repeated using the toughened recipe of Example 3. A test piece having a granite appearance was successfully produced.

EXAMPLE 10

A mixture comprising 40% ATH, 48% of the acrylic polymer used in Example 1 and 12% of the decorative particles (smaller size) were dry blended and successfully injection moulded at 190° C.

EXAMPLE 11

A mixture comprising 30% magnesium hydroxide (average particle size about 2–5 microns), 58% of the acrylic polymer used in Example 1 and 12% of the decorative particles (smaller size) were dry blended and successfully injection moulded at 190° C. The Charpy impact strength was measured as 10.52 kJm$^{-2}$.

EXAMPLE 12

A mixture comprising 10% magnesium hydroxide, 78% of the acrylic polymer used in Example 1 and 12% of the decorative particles (smaller size) were dry blended and successfully injection moulded at 190° C. The Charpy impact strength was measured as 17.94 kJm$^{-2}$.

Table 1 shows the measured properties of the samples made in some of the Examples. Flexure testing was in accordance with ISO 178 and impact testing was in accordance with ISO 179. The properties of a composite product containing about 60 wt % ATH in PMMA made by the cell cast process are also shown for comparison.

TABLE 1

| Sample | Flex Mod (Gpa) | Flex Strength (Mpa) | Displacement At Break (mm) |
|---|---|---|---|
| Control (cast) | 8.88 | 67.32 | 1.03 |
| Example 1 | 3.54 | 69.20 | 2.82 |
| Example 3 | 2.08 | 35.00 | 2.49 |
| Example 8 | 4.14 | 64.92 | 1.80 |
| Example 9 | 3.66 | 61.58 | 2.60 |

What is claimed is:

1. A process which comprises: preparing a mixture comprising
   (i) 20 to 89 wt %, relative to the total weight of said mixture, of an acrylic material consisting essentially of an acrylic polymer which is a copolymer containing 50 to 99 wt % of methyl methacrylate units and 1 to 50 wt % of alkyl acrylate units;
   (ii) 10 to 80 wt %, relative to the total weight of said mixture, of a mineral filler selected from the group consisting of alumina trihydrate, magnesium hydroxide, talc and barium sulphate; and
   (iii) 1 to 40 wt %, relative to the total weight of said mixture, of decorative particles; and
   melt-molding the mixture at a temperature above 150° C. to form a solid acrylic article.

2. A process as claimed in claim 1, wherein said copolymer comprises 70 to 95 wt % methyl methacrylate units and 5 to 30 wt % of C$_1$–C$_4$ alkyl acrylate units.

3. A process as claimed in claim 1, wherein said copolymer has a Tg of at least 60° C.

4. A process as claimed in claim 1, wherein the mixture contains (iii) 5 to 25 wt % of decorative colored particles.

5. A process as claimed in claim 1, wherein the molding temperature is in the range of above 150 to 220° C.

6. A process as claimed in claim 1, wherein said melt molding is carried out by extruding the mixture through a die.

7. A process as claimed in claim 1, wherein said melt molding is carried out by injection molding said mixture into a mold.

8. A process as claimed in claim 1, wherein said mixture comprises
   (i) 40 to 80 wt %, relative to the total weight of said composition, of said acrylic polymer;
   (ii) 10 to 50 wt %, relative to the total weight of said composition, of said filler; and
   (iii) 10 to 30 wt %, relative to the total weight of said composition, of said decorative particles.

9. A process as claimed in claim 1, wherein said mixture comprises
   (i) 40 to 80 wt %, relative to the total weight of said composition, of said acrylic polymer;
   (ii) 10 to 50 wt %, relative to the total weight of said composition, of said filler; and
   (iii) 5 to 20 wt %, relative to the total weight of said composition, of said decorative particles.

10. A moldable composition comprising:
    (i) 20 to 89 wt %, relative to the total weight of said composition, of an acrylic material consisting essentially of an acrylic polymer which is a copolymer containing 50 to 99 wt % of methyl methacrylate units and 1 to 50 wt % of alkyl acrylate units;
    (ii) 10 to 80 wt %, relative to the total weight of said composition, of a mineral filler selected from the group consisting of alumina trihydrate, magnesium hydroxide, talc and barium sulphate; and
    (iii) 1 to 40 wt %, relative to the total weight of said composition, of decorative particles;
    wherein the molecular weight of the acrylic polymer is in the range of 60,000 to 180,000.

11. A moldable composition as claimed in claim 10, wherein said copolymer comprises 70 to 95 wt % methyl methacrylate units and 5 to 30 wt % of C$_1$–C$_4$ alkyl acrylate units.

12. A moldable composition as claimed in claim 10, wherein said copolymer has a Tg of at least 60° C.

13. A moldable composition as claimed in claim 10, which contains (iii) 5 to 25 wt % of decorative colored particles.

14. A moldable composition as claimed in claim 10, further comprising 1 to 30% by weight, relative to the total weight of said composition, of a toughening compound.

15. A moldable composition as claimed in claim 10, comprising
    (i) 40 to 80 wt %, relative to the total weight of said composition, of said acrylic polymer;
    (ii) 10 to 50 wt %, relative to the total weight of said composition, of said filler; and
    (iii) 10 to 30 wt %, relative to the total weight of said composition, of said decorative particles.

16. A moldable composition as claimed in claim 10, comprising
    (i) 40 to 80 wt %, relative to the total weight of said composition, of said acrylic polymer;
    (ii) 10 to 50 wt %, relative to the total weight of said composition, of said filler; and
    (iii) 5 to 20 wt %, relative to the total weight of said composition, of said decorative particles.

17. A molded article in the form of a sheet of material formed by molding a moldable composition as claimed in claim 10 in its molten state and subsequently cooling, said article being further shapeable above its softening point.

18. A molded article as claimed in claim 17, wherein the sheet of material is formed by molding the moldable composition at a temperature above 150° C.

19. A shaped article obtained by thermoforming a molded article as claimed in claim 17.

20. The moldable composition of claim 10, wherein said alkyl acrylate units are selected from the group consisting of methyl acrylate, ethyl acrylate, and butyl acrylate.

21. A process as claimed in claim 1, wherein the solid acrylic article is in the form of a sheet.

22. A process as claimed in claim 1, wherein the molecular weight of the acrylic polymer is in the range of 60,000 to 180,000.

23. A process as claimed in claim 1, wherein the mineral filler is alumina trihydrate.

24. A process as claimed in claim 1, wherein the mineral filler is magnesium hydroxide.

25. A process as claimed in claim 1, wherein the mineral filler is talc.

26. A process as claimed in claim 1, wherein the mineral filler is barium sulphate.

27. A moldable composition as claimed in claim 10, wherein the mineral filler is alumina trihydrate.

28. A moldable composition as claimed in claim 10, wherein the mineral filler is magnesium hydroxide.

29. A moldable composition as claimed in claim 10, wherein the mineral filler is talc.

30. A moldable composition as claimed in claim 10, wherein the mineral filler is barium sulphate.

* * * * *